(No Model.)   2 Sheets—Sheet 1.
W. F. MANGELS.
BICYCLE RAILWAY.
No. 604,998.   Patented May 31, 1898.
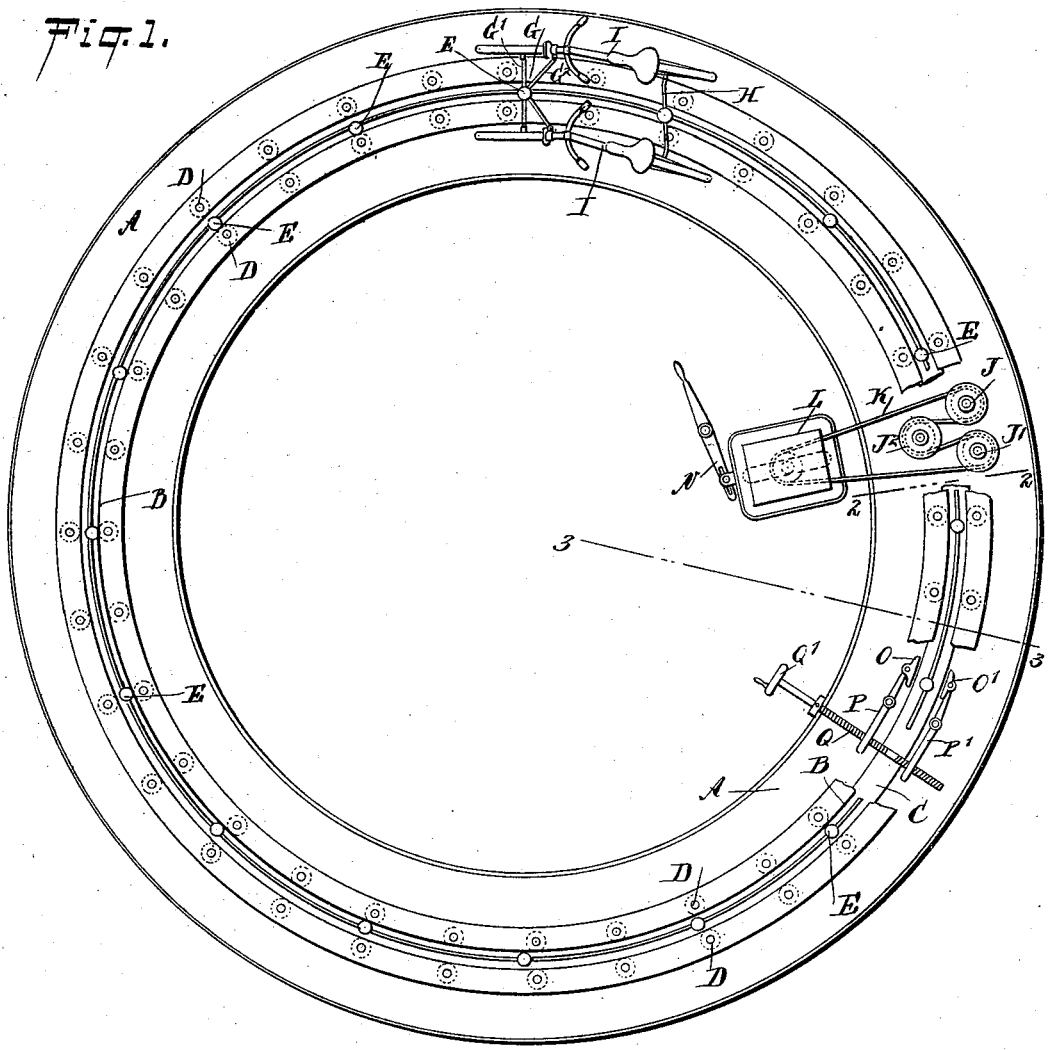
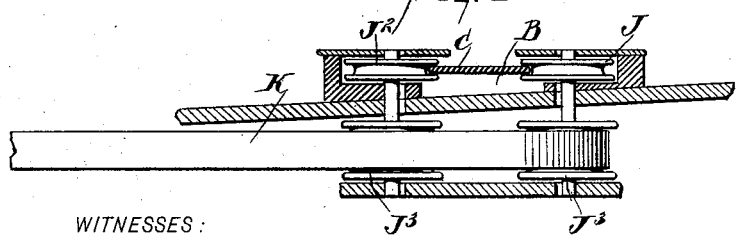
WITNESSES:
William P. Goebel.
Rev. G. Hoster
INVENTOR
W. F. Mangels
BY
ATTORNEYS.

(No Model.) 2 Sheets—Sheet 2.
W. F. MANGELS.
BICYCLE RAILWAY.
No. 604,998. Patented May 31, 1898.
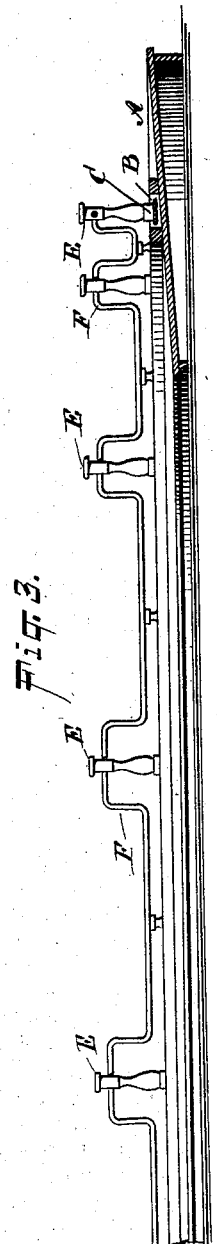
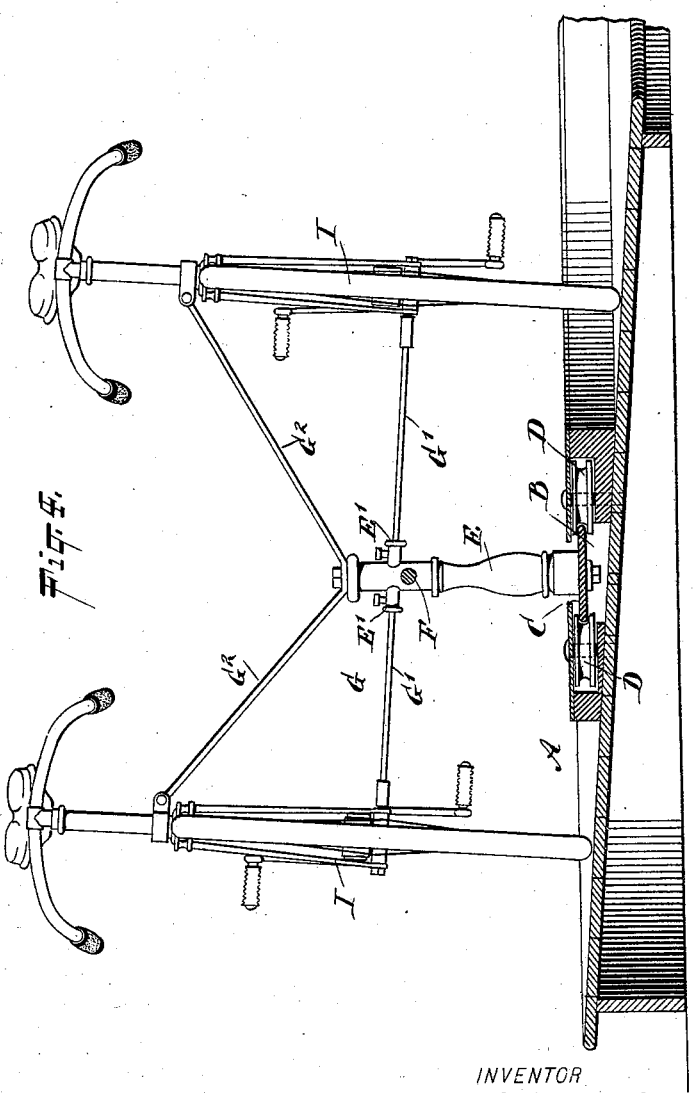
WITNESSES:
William P. Gaebel.
Rev. G. Hosted
INVENTOR
W. F. Mangels.
BY
ATTORNEYS.

UNITED STATES PATENT OFFICE.

WILLIAM F. MANGELS, OF BROOKLYN, NEW YORK, ASSIGNOR OF ONE-HALF TO WILLIAM S. SMITH, OF SAME PLACE.

BICYCLE-RAILWAY.

SPECIFICATION forming part of Letters Patent No. 604,998, dated May 31, 1898.

Application filed September 29, 1897. Serial No. 653,494. (No model.)

*To all whom it may concern:*

Be it known that I, WILLIAM F. MANGELS, of Brooklyn, (Coney Island,) in the county of Kings and State of New York, have invented a new and Improved Bicycle-Railway, of which the following is a full, clear, and exact description.

The object of the invention is to provide a new and improved bicycle-railway more especially designed for the use of unskilled persons to enable them to enjoy bicycle-riding with the utmost safety.

The invention consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a plan view of the improvement with parts broken out. Fig. 2 is an enlarged sectional side elevation of the auxiliary driving mechanism for the endless band, the section being taken on the line 2 2 of Fig. 1. Fig. 3 is a sectional side elevation of the improvement on the line 3 3 of Fig. 1, and Fig. 4 is an enlarged transverse section of the improvement.

The improved bicycle-railway is provided with a continuous track A, preferably made circular and slightly inclined downwardly from the outer edge to the inner edge, as plainly indicated in Fig. 3, the said track being constructed in the form of a ring-shaped floor.

On the track A is built or formed an annular duct B, in which is mounted to travel an endless band C, preferably made of sheet metal in ring shape and of a flat cross-section, as plainly indicated in Figs. 2 and 4, the edges of the band traveling in the annular grooves of bearing-wheels D, journaled in the sides of the duct B. It is evident, however, that the endless band C may be made in different shape and constructed of different material, the main feature being that the band is endless and mounted to travel in the duct B.

On the band C are secured at suitable intervals posts E, connected with each other by a brace F, preferably depressed between adjacent posts to permit passengers to readily step on the track from one side of the duct B to the other. The two adjacent posts E are provided with frames G and H, of which the frame G is connected by a transverse bar or rod G' with the axle of the front or steering wheel of a bicycle I and by another inclined brace G² with the steering-head of the said bicycle I. The other frame H is provided with a transverse bar or rod connected with the axle of the rear or drive wheel of the said bicycle.

As illustrated in the drawings, the frames G and H are made double and extend on opposite sides of the posts, with the two bicycles I mounted to travel on the track on the opposite sides of the duct B. The rods G' are held in suitable sockets E', attached to the posts E, and the braces G² are bolted to the top of the posts, as is plainly indicated in Fig. 4. Now by the arrangement described a large number of such sets of bicycles can be attached to the posts on the band C to accommodate a large number of persons at the same time. It is evident that when the bicycles I are occupied by persons and said persons actuate the pedals then the bicycles move forward on the track A, carrying the band C along, and as the said bicycles are rigidly supported in an upright position it is evident that the persons riding on the bicycles need not be skilled in the art of bicycle-riding, as there is no danger of the bicycles upsetting owing to their rigid supports.

If but a few persons are on some of the bicycles at a time, it is necessary to impart a traveling motion to the band C, as otherwise it would require too much work on the part of individuals to set the machines in motion on the track, as the band C and all its posts and bicycles connected therewith travel simultaneously. In order to give such motion to the band C, I provide an auxiliary driving device consisting of outer pulleys J J' and an inner pulley J² for frictional engagement with the edges of the band C, as is plainly indicated in Figs. 1 and 2.

On the shafts of the pulleys J J' J² are secured belt-pulleys J³, engaged by a belt K, connected with the pulley of a motor L, driven by electricity or other suitable means, and fitted to slide on a suitable foundation by means of a lever N under the control of the operator to draw the belt K tight on the pulleys $J^3$ to move the pulleys $J J' J^2$ in firm frictional contact with the band C, so as to impart a rotary motion to the latter when the motor is started up. The shafts for the pulleys $J J' J^2$ are fitted to slide in suitable bearings, so that the said pulleys can move readily in or out of frictional contact with the edges of the band C, as it is evident that when the band C is started the riders on the several wheels can keep up the motion. The operator then stops the motor L to release the wheels $J J' J^2$ from the band C.

In order to stop the band C and the bicycles after a ride is completed, I provide jaws O O', arranged within the duct B and adapted to clamp the edges of the band on opposite sides, as is plainly indicated in Fig. 1. The jaws O O' are pivoted on levers P P', respectively, in which screws a screw-rod Q, having a right and left hand thread for the said levers, and which screw-rod is mounted to turn in suitable bearings on the track A. The inner end of the said screw-rod is provided with a hand-wheel Q' under the control of the operator to turn the said screw-rod and impart a swinging motion to the levers P and P', so as to move the jaws O or O' in or out of engagement with the band C. When the jaws O O' move in engagement with the band, the traveling motion of the latter soon ceases and the bicycles come to a standstill.

Having thus fully described my invention, I claim as new and desire to secure by Letters Patent—

1. A bicycle-railway, comprising a continuous track, guide-wheels, an endless band of rigid material adapted to travel on the said guide-wheels, and a rigid support erected on the said band and connected with the bicycles arranged to travel on the track, substantially as shown and described.

2. A bicycle-railway, comprising a continuous track, a duct on the said track, an endless band of rigid material mounted to travel in the said duct, posts erected at intervals on the said band, frames carried by the said posts and connected with the bicycles traveling on the said track, and a brace arranged above the said band and connecting the several posts with each other, as set forth.

3. A bicycle-railway, comprising a continuous track, an endless band of rigid material movable in a duct in the said track, posts erected at intervals on the said band, frames provided with transverse rods or bars connecting adjacent posts with the axles of the front and rear wheels of the bicycles respectively, and a brace connecting the several posts with each other, substantially as specified.

4. A bicycle-railway, comprising a continuous track, an endless movable band, posts erected at intervals on the said band, frames provided with transverse rods or bars connecting adjacent posts with the axles of the front and rear wheels of the bicycles respectively, and a brace extending above the said band and connecting the said posts, the said brace being depressed between adjacent posts, substantially as shown and described.

5. A bicycle-railway, comprising a continuous track, an endless band of rigid material movable in a duct on the said track, means for connecting the band with the bicycles arranged to travel on the said track and a device for clamping the said band to stop the same, substantially as shown and described.

6. A bicycle-railway provided with a continuous track, guide-wheels, an endless band traveling on the said guide-wheels, posts erected at intervals on the said band, frames provided with transverse rods or bars connecting adjacent posts with the axles of the front and rear wheels of the bicycles respectively, a brace connecting the several posts with each other, an auxiliary starting device for imparting a traveling motion to the said band, and a stopping device for said band, substantially as shown and described.

7. A bicycle-railway, comprising a continuous track, an endless movable band of rigid material, means for connecting the band with the bicycles traveling on the track, and a stopping device for the said band comprising jaws adapted to clamp the edge of the band on opposite sides, and means for moving the jaws in or out of engagement with the band, substantially as set forth.

8. A bicycle-railway, comprising a continuous track, a duct on the said track, guide-wheels journaled in the walls of said duct, an endless band of rigid material arranged to travel on the said guide-wheels, means for connecting the band with bicycles mounted to travel on the track, and an auxiliary driving device for the said band comprising pulleys arranged for frictional engagement with the edges of the band, and means for driving the said pulleys, substantially as shown and described.

WILLIAM F. MANGELS.

Witnesses:
THEO. G. HOSTER,
JNO. M. RITTER.